United States Patent [19]

Masaki et al.

[11] Patent Number: 4,983,875
[45] Date of Patent: Jan. 8, 1991

[54] ACTUATOR

[75] Inventors: Ryoso Masaki; Masahiro Kayama, both of Hitachi; Hiroshi Hayashida, Kure; Hideki Nihei, Hitachi; Yasunori Katayama, Mito; Hiroshi Nagase, Hitachi; Toshihiko Matsuda, Hitachi; Kenzo Kamiyama, Hitachi, all of Japan

[73] Assignee: Hitachi, Ltd., Tokyo, Japan

[21] Appl. No.: 367,663

[22] Filed: Jun. 19, 1989

[30] Foreign Application Priority Data

Jun. 20, 1988 [JP] Japan .................................. 63-150308
Sep. 8, 1988 [JP] Japan .................................. 63-225269

[51] Int. Cl.$^5$ ............................................ H01L 41/08
[52] U.S. Cl. .................................. 310/323; 310/317; 310/316; 310/328; 901/14
[58] Field of Search ............... 310/323, 321, 328, 322, 310/366, 369, 316, 317; 901/14

[56] References Cited

U.S. PATENT DOCUMENTS 3,899,728  8/1975  Hoppe ............................. 310/328 X
4,727,278  2/1988  Staufenberg, Jr. et al. ........ 310/328

FOREIGN PATENT DOCUMENTS 0141978  6/1987  Japan ................................... 310/323

Primary Examiner—Mark O. Budd
Attorney, Agent, or Firm—Antonelli, Terry, Stout & Kraus

[57] ABSTRACT

An actuator suitable for use in a joint device for driving a robot arm or in a subject follow-up device in a video camera, etc., is designed to have a mobility of a freedom of two degrees or more and is adapted to drive a movable part directly using first piezoelectric motor elements each of which consists of piezoelectric elements having a non-ring-like configuration and an elastic body and second piezoelectric motor elements each of which consists of at most one ring-like piezoelectric element and an elastic member. The actuator exhibits a simplified structure, is small and lightweight, provides a powerful driving power and has a wide range of mobility.

27 Claims, 9 Drawing Sheets

ACTUATOR

BACKGROUND OF THE INVENTION

This invention relates to an actuator having a mobility of two or more degrees of freedom and to a robot mechanism designed to utilize such an actuator. In particular, this invention relates to an actuator which is suitable for use in an automatic subject follow-up device for a video camera and a joint device in a robot.

Conventionally, an actuator having a high degree of freedom, in particular a mobility of a freedom of three degrees or more, such as one used in a robot joint mechanism, has been designed to be supplied with driving forces by two or more pulse motors, as described in No. 533, page 821 to 822 of the collection of treatises in respect of the scientific lectures given at the Spring 1984 Meeting of the Precision Instrument Society. This conventional design involves a complicated device structure and a large size.

In view of this, a small and lightweight actuator was later developed in the form of a system using ring-like piezoelectric motor elements, each of which consists of piezoelectric elements, this being described in Japanese Patent Laid-Open No. 62-141978.

However, since the above conventional actuator utilizes a plurality of ring-like piezoelectric motor elements, the area of the parts thereof that are driven by the piezoelectric elements is quite small in comparison with the contact area between the driving member and the driven member, resulting in a rather weak driving force.

SUMMARY OF THE INVENTION

It is accordingly an object of this invention to provide an actuator in which the area of the parts thereof that are driven by piezoelectric elements is widened, which is small and lightweight, and which is capable of generating a powerful driving force.

In accordance with this invention, the above object can be achieved by an actuator structure in which, instead of ring-like piezoelectric motor elements, piezoelectric motor elements that are adapted to generate progressive waves in one direction are alternately arranged with piezoelectric motor elements of another type that are adapted to generate progressive waves in a different direction, for example, in a direction perpendicular to that of the progressive waves generated by the elements of the first type, over the entire surface area of the spherical contact between a driving member and a driven member.

When arbitrarily arranging two types of piezoelectric motor elements adapted to generate progressive waves in different directions, the above object can be attained by controlling the magnitude and phase of the voltages supplied to the respective piezoelectric motor elements.

When voltage is applied to an piezoelectric element, it is elongated or contracted. Accordingly, application of an alternating voltage to the element causes oscillation thereof. If two piezoelectric elements having this characteristic are glued to each other with a deviation of λ/4 (λ: oscillation wavelength) and voltage is applied thereto while changing the magnitude and phase of the voltage, the piezoelectric elements generate progressive waves. This piezoelectric-element pair is referred to as a piezoelectric motor element generating progressive waves in one direction. By alternately arranging a plurality of piezoelectric motor elements generating progressive waves in one direction and piezoelectric motor elements generating progressive waves in a different direction over the entire area of a spherical contact surface between a driving member and a driven member and controlling the voltage applied to these piezoelectric motor elements, the driven member can be made to move in any mechanically movable direction. If the piezoelectric motor elements are respectively assigned to three orthogonal operational directions, movements in three directions can be realized through simple voltage control. If the voltages applied to the respective piezoelectric motor elements can be controlled individually, the position of the driven member can be changed arbitrarily even when the directions of the progressive waves generated by the piezoelectric motor elements are set arbitrarily.

DESCRIPTION OF THE PREFERRED EMBODIMENTS

An embodiment of this invention will now be described with reference to FIG. 1.

Figure 1:
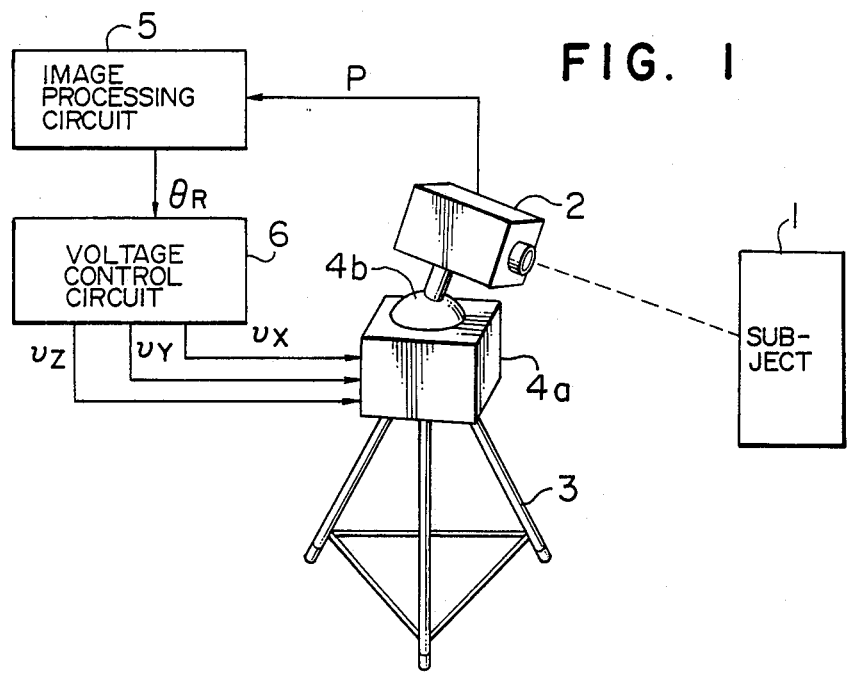
FIG. 1 is a block diagram of an embodiment of this invention applied to an automatic subject follow-up device.

In the example shown in FIG. 1, the actuator of this invention is applied to an automatic subject follow-up device in a video camera. A video camera 2 used to photograph a subject 1 is mounted on an actuator 4 installed on a tripod 3. This actuator 4 comprises a driving member 4a and a driven member 4b.

First, an image signal p of the subject 1 being photographed by the video camera 2 is input to an image processing circuit 5. This image processing circuit 5 stores information on the image signals p of the images which have already been photographed, and performs image processing by comparing this information with that on the image signal p of the newly taken image. The image processing consists, for example, of contour intensification, differentiation, stressing, etc., used for obtaining information on the movement of the subject 1. On the basis of the information thus obtained, a movement instruction $\theta_R$ for the video camera 2 is calculated by means of the image processing circuit 5 and is input to a voltage control circuit 6. Generated in this voltage control circuit 6 on the basis of the movement instruction $\theta_R$ are alternating voltages vx, vy and vz acting in the directions of the three axes of the actuator 4, which axes intersect each other perpendicularly. This causes the actuator to operate, enabling the video camera 2 to follow the movement of the subject 1. It is necessary here to detect the movement of that part of the subject 1 which it is most desired to photograph. This could be achieved by several methods. If, for example, the object which it is desired should be photographed is constantly set in the middle of the image, the movement of the image center can be stressed to a large degree. When following the general flow of a particular mass, for example, a crowd of people or a cloud, automatic subject follow-up control can be effected by utilizing an average value representing the movement of the entire image as the movement instruction $\theta_R$.

Figure 2:
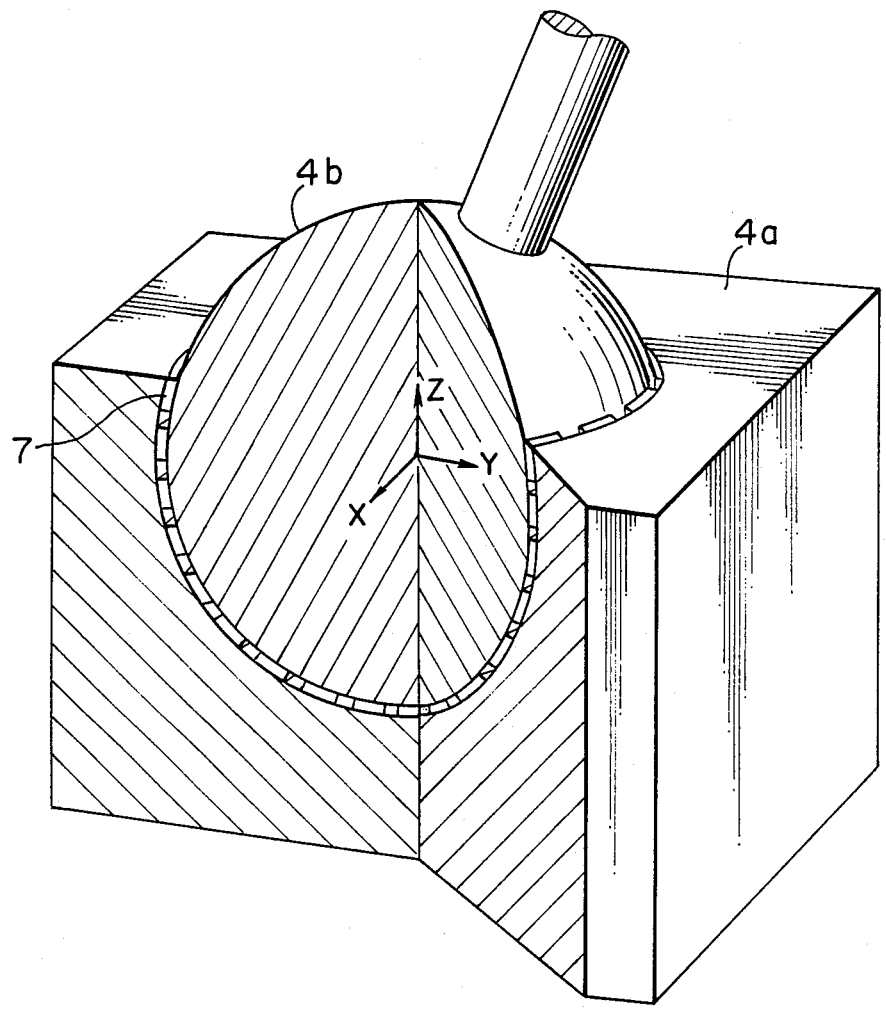
FIG. 2 is a partly sectional view showing the structure of the actuator shown in FIG. 1.

The actuator 4 of this invention will now be described in detail. FIG. 2 is a sectional view of the actuator 4 comprising a driving member 4a installed on the tripod 3, a driven member 4b on which the video camera 2 is mounted, and piezoelectric motor elements 7 for driving the driven member 4b. The driving member 4a includes a spherical inner surface. The driven member 4b, which has a spherical section adapted to be brought into contact with the spherical inner surface of the driving member 4a, is inserted into the driving member 4a and can be rotated therein around the X-, Y- and Z-axes which intersect each other perpendicularly at the center of the spherical section.

Figure 3A:
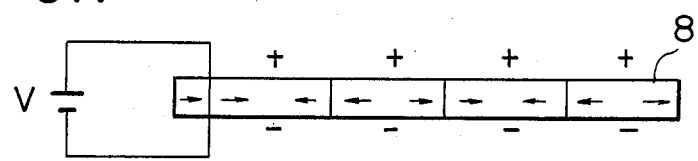
FIGS. 3A to 3D illustrate the operational principle of a piezoelectric motor element.
Figure 3B:
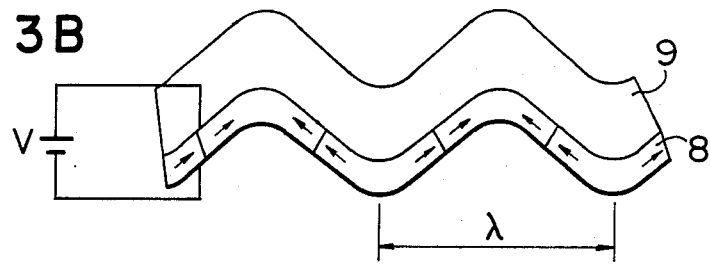
Figure 3C:
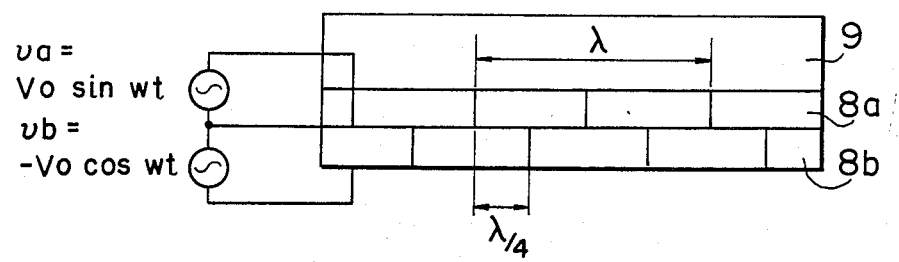
Figure 3D:
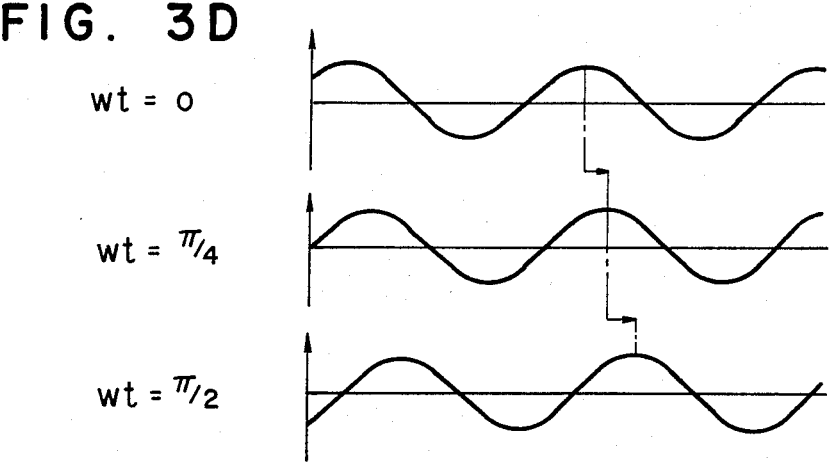

Here, the operational principle of the piezoelectric elements 7 which are adapted to generate progressive waves will be illustrated with reference to FIGS. 3A-3D. Piezoelectric elements 8 have the property of generating distortions depending on the direction and magnitude of any voltage applied thereto. In view of this, piezoelectric elements which, are, elongated by a voltage V and which are contracted by the same voltage V are arranged alternately, as shown in FIG. 3A. If the voltage V is applied in the direction reverse to that of FIG. 3A, distortions are generated in the directions reverse to those indicated by the arrows of FIG. 3A. If these piezoelectric elements 8 are bonded to an elastic member 9 and the voltage V is applied to them, they undergo deformation as shown in FIG. 3B. If, in this condition, an alternating voltage is applied to them instead of the voltage V, standing waves are generated. The wavelength of these standing waves will be referred to as $\lambda$. In the example shown in FIG. 3C, bonded to an elastic member 9 are piezoelectric elements 8a to which piezoelectric elements 8b are in turn bonded in such a manner that distortions of the piezoelectric elements 8a will deviate from those of the piezoelectric elements 8b by $\lambda/4$ ($\lambda$: the wavelength of the standing wave). In this way, a piezoelectric motor element 7 is formed. Further, this element 7 is designed such that the phase of the alternating voltage $v_b$ applied to the piezoelectric elements 8b is delayed by 90° with respect to that of the alternating voltage $v_a$ applied to the piezoelectric elements 8a. As shown in FIG. 3D, the waveform of the piezoelectric motor element 7 shown in FIG. 3C is shifted to the right with the passage of time. When the phase of the alternating voltage $v_b$ is advanced by 90° with respect to the alternating voltage $v_a$, a shift occurs in the vertical direction. This is the principle of the piezoelectric motor elements for generating progressive waves. While in the example in FIG. 3C the voltage applied is shown as an alternating voltage having a sinusoidal waveform, the same effect can be attained with a voltage having any other type of waveform, as long as it is an alternating one.

Figure 4:
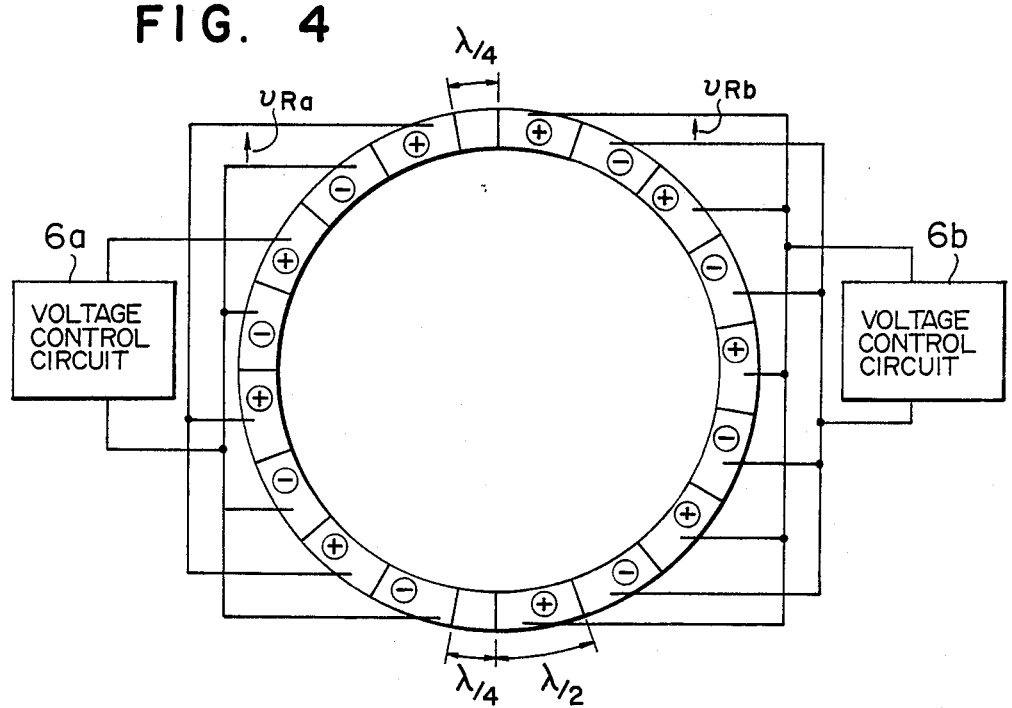
FIG. 4 is an explanatory drawing showing the way in which a driving member equipped with such a piezoelectric motor element is operated.

Next, the method of generating the progressive waves for moving the driven member 4b will be described. FIG. 4 shows, by way of example, the method of applying voltage for the rotation around the Z-axis. The piezoelectric elements for effecting rotation around the Z-axis are divided into two groups, which are respectively supplied with alternating voltages $v_{Ra}$ and $v_{Rb}$ from voltage control circuits 6a and 6b. The piezoelectric elements of each group are arranged with a space of $\lambda/2$. The alternating voltages $v_{Ra}$ and $v_{Rb}$ are applied to the respective groups of piezoelectric elements, thereby generating oscillations due to expansion and contraction of the piezoelectric elements. By appropriately changing the respective phases of the alternating voltages $v_{Ra}$ and $v_{Rb}$ applied by the voltage control circuits 6a and 6b, clockwise or counterclockwise progressive waves can be generated. If, for example, the phase of the alternating voltage $v_{Rb}$ is delayed by 90° relative to that of the alternating voltage $v_{Ra}$, the clockwise progressive wave alone remains, causing rotation at a maximum speed. If the phase difference is set to 270°, only the counterclockwise progressive wave remains, causing maximum speed rotation in the reverse direction. When the phase difference is 180°, no progressive waves are generated. By thus changing the phases, the direction and magnitude of progressive waves can be set arbitrarily.

When such progressive waves are generated, a fine elliptical rotation in the reverse direction to the progressive waves is also generated on the surface of the elastic member 9. Accordingly, the driven member 4b which is in contact with the elastic member 9 moves in the direction reverse to that of the progressive waves. That is, by virtue of the piezoelectric elements shown in FIG. 4, the driven member 4b can be rotated around the Z-axis.

Figure 5:
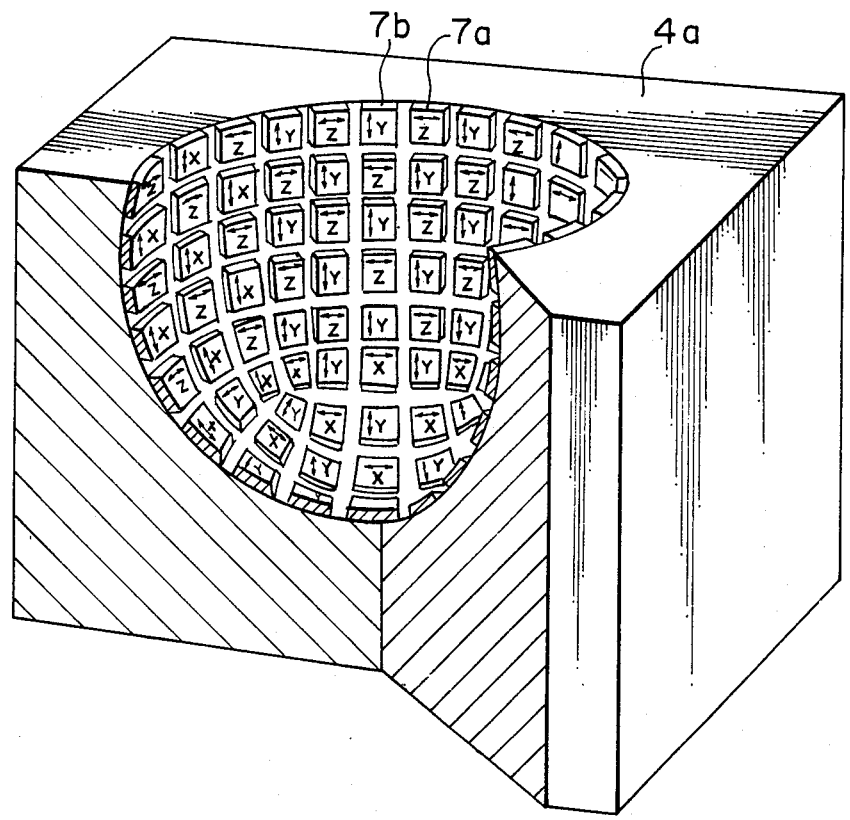
FIG. 5 is a partly sectional view of the actuator of FIG. 2 with the driven member removed.

The principle in accordance with which rotations in three orthogonal directions are effected in this embodiment will now be described. FIG. 5 shows the way the piezoelectric motor elements 7, which constitute a feature of this invention, are arranged. Shown in FIG. 5 is the inner structure of the driving member 4a with the driven member 4b removed. The arrows on the piezoelectric motor elements 7 indicate the directions of progressive waves, the piezoelectric motor elements being arranged over the entire spherical inner surface in such a manner that adjacent piezoelectric motor elements 7a and 7b generate progressive waves in orthogonal directions. The alternating voltages vx, vy and vz which are output from the voltage control circuit 6 shown in FIG. 1 for the purpose of driving the driven member in three directions are respectively applied to the piezoelectric motor elements with the characters X, Y and Z. With this arrangement, individual rotational movements around three axes intersecting each other perpendicularly can be effected by means of a voltage control circuit 6 having a relatively simple circuit configuration.

Thus, in accordance with this embodiment, the piezoelectric motor elements 7 adapted to generate driving forces can be arranged over the entire surface of the driven member which is in contact with them, thereby making it possible to construct an actuator 4 which is small and lightweight and which provides a powerful driving force. Furthermore, this embodiment allows a movement of three degrees of freedom to be realized with a single actuator 4, so that the automatic subject follow-up device can also be made smaller and lighter. In addition, when performing control using an image signal as the feedback, the actuator 4 can be directly positioned without using any gears or the like, thereby making it possible to realize an automatic follow-up device involving no oscillations and having a satisfactory degree of responsiveness. When used in photography on a ship or in a helicopter, this device can also feed back the sway of the floor, thereby allowing stable images to be taken.

Figure 13:
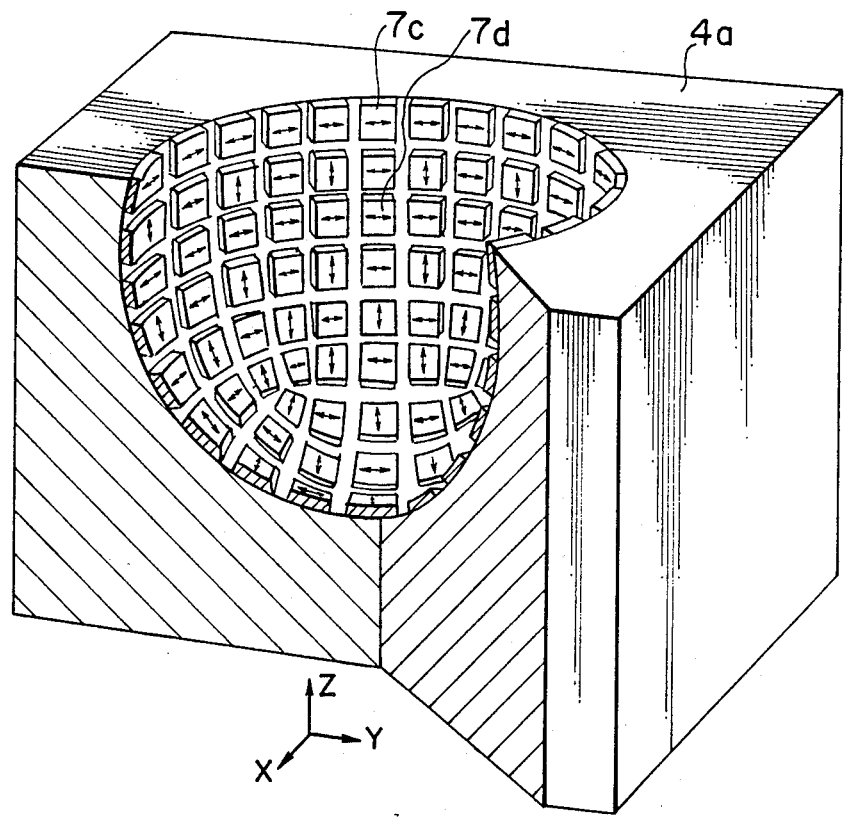
FIG. 13 is a partly sectional and partly diagrammatic view of a driving member in an embodiment which differs from that shown in FIG. 5.
Figure 13:
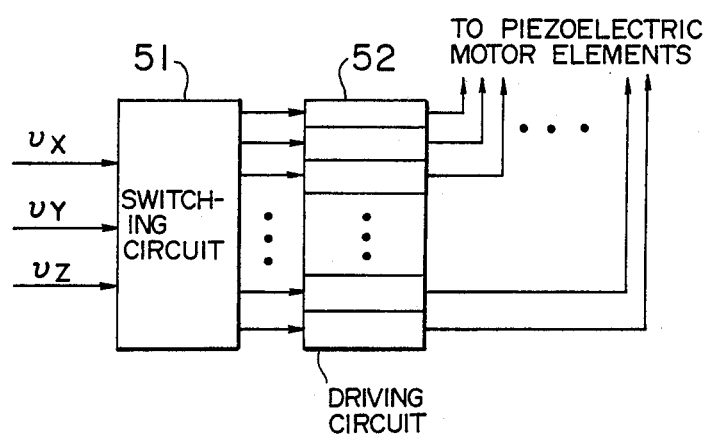

FIG. 13 shows another embodiment of this invention in which the driving force for the rotation around the Z-axis is intensified as compared with the embodiment shown in FIG. 5. It differs from the embodiment shown in FIG. 5 in that the piezoelectric motor elements 7 not only serve to cause rotations around particular respective axes, but also contribute to the rotations around the other axes. This will be described below.

In this embodiment, alternating voltages vx, vy and vz which are output from a voltage control circuit 6 are not directly input to respective piezoelectric motor elements 7, but are input to a voltage instruction switching circuit 51. In this voltage instruction switching circuit 51, instructions are given to a piezoelectric motor driving circuit 52 in such a manner that driving forces suitable for causing rotation around the respective axes will be provided in accordance with the values of the alternating voltages, thereby generating the requisite voltages to be applied to the respective piezoelectric motor elements 7. This will be explained, by way of example, with reference to two piezoelectric motor elements 7c and 7d. If rotation around, for example, the Z-axis is to be effected, the requisite driving force can be obtained by generating in the piezoelectric motor elements 7c and 7d progressive waves in the same direction. If, conversely, progressive waves in reverse directions are generated in the piezoelectric motor elements 7c and 7d, rotation around the X-axis can be effected. By thus using the voltage instruction switching circuit 51, driving forces in two or more directions can be generated.

Accordingly, this embodiment makes it possible to further augment the driving forces for causing rotation in any desired direction.

Figure 6:
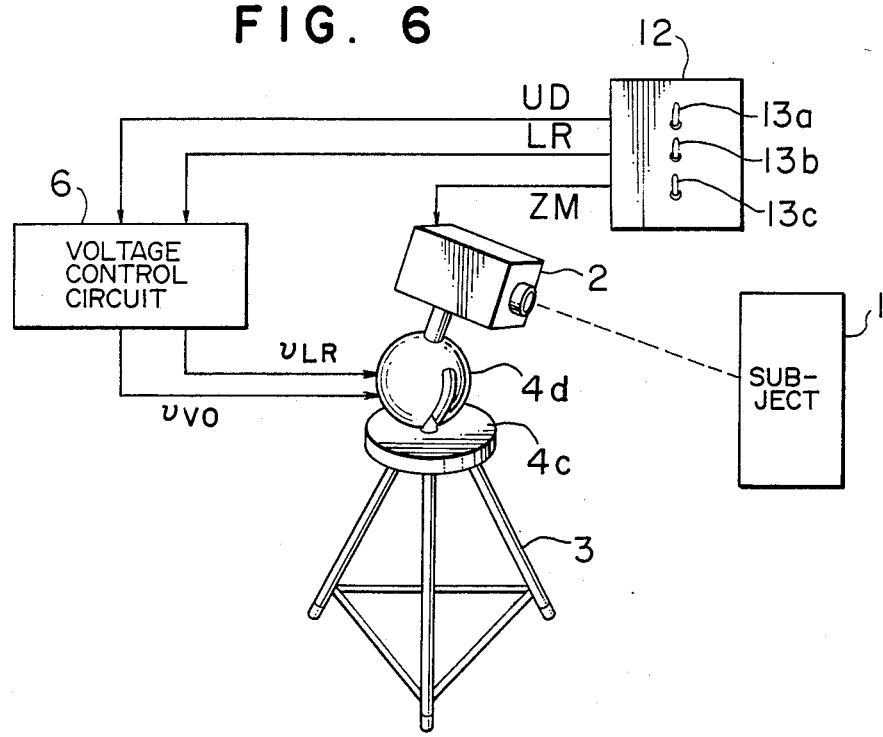
FIG. 6 is a block diagram of an embodiment of this invention applied to a remote-control video camera.

FIG. 6 shows an embodiment of this invention applied to a remote-control video camera apparatus in which the position of a video camera 2 during photography is determined through remote control. The embodiment shown in FIG. 6 differs from that shown in FIG. 1 in that it employs a remote-control apparatus 12 instead of an image processing device 5, and that it has an actuator 4 the structure of which is different from that shown in FIG. 1.

First, a photographer who is in a subject 1 or at a position apart from a video camera manipulates three remote-control levers 13 which are provided on the remote-control apparatus 12, thereby generating an up-down signal UD, a left-right signal LR or a zoom signal ZM. The zoom signal ZM is input to the video camera 2 to cause the image size to be changed by shifting the lens position. The up-down signal UD and the left-right signal LR are input to a voltage control circuit 6 which generates, in accordance with these signals, alternating voltages $v_{UD}$ and $v_{LR}$ to be applied to the piezoelectric elements of the actuator 4.

Figure 7:
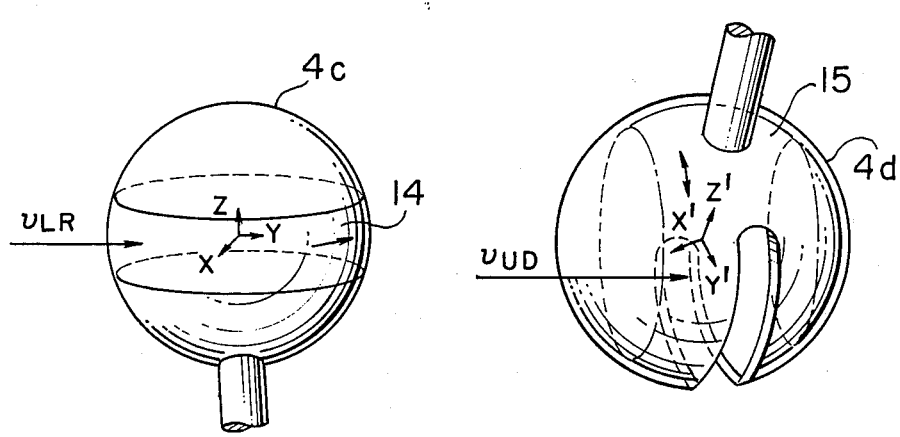
FIG. 7 is an exploded view of the actuator used in the embodiment shown in FIG. 6.

The construction of this actuator, which differs from that shown in FIG. 1, will now be described with reference to FIG. 7. The drawing shows the actuator 4 in the disassembled state as a driving member 4c and a driven member 4d. Mounted on the driving member 4c is a piezoelectric motor element for rotation 14 for rotating the video camera 2 around the Z-axis of the driving member 4c. Although the piezoelectric motor element 14 is shown as having a ring-like shape, it may also be formed so as to cover the entire surface of the driving member 4c. Mounted on the driven member 4d, on the other hand, is a piezoelectric motor element for vertical movement 15 for moving the video camera 2 in the vertical direction. By inputting the alternating voltages $v_{LR}$ and $v_{UD}$ to the piezoelectric motor elements for rotation and vertical movement 14 and 15, respectively, a remote-control photographic operation using the video camera 2 can be conducted while retaining the vertical positional relationship both in the image and in the actual subject. Furthermore, the construction of the actuator 4 allows the video camera 2 to move in the vertical direction over a movable range of 180° or more, thereby making it possible to photograph in all directions including immediately above and below.

Thus, this embodiment allows photography to be performed in all directions while constantly retaining the correct vertical positional relationship in the image without conducting any complicated coordinate transformation. Furthermore, since two piezoelectric motor elements suffice, the voltage control circuit 6 can be simplified. In addition, the mounting of piezoelectric elements on not only the driving member 4c but also the driven member 4d enables the area available for installation of the piezoelectric motor elements to be widened, thereby allowing an actuator 4 that is capable of providing a powerful driving force to be constructed. Moreover, this apparatus allows the photographer himself to be the subject. A particular benefit is that this apparatus can be constructed at low cost.

Figure 8:
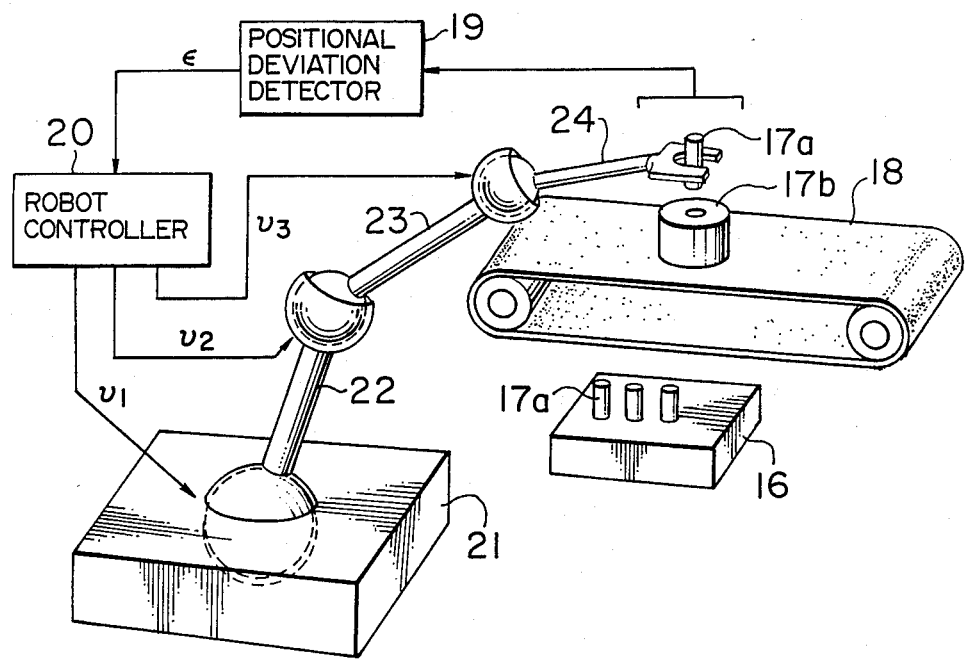
FIG. 8 is a block diagram of an embodiment of this invention applied to an assembly robot.

FIG. 8 shows an embodiment of the actuator of this invention as applied to an assembly robot. In the process illustrated, a part 17a placed on a bench 16 is inserted into a part 17b on a belt conveyor 18 by means of a robot. In inserting the part 17a into the part 17b, any deviation in the fitting is detected by a positional deviation detector 19. The principle of this positional deviation detector 19 may be based on, for example, image processing. A deviation signal from this positional deviation detector 19 is input to a robot control apparatus 20, in which control calculation is conducted such as to diminish the deviation, outputting voltages $v_1$, $v_2$ and $v_3$ that are to be applied to respective actuators 21, 21 and 23 constituting members of the robot. These voltages $v_1$, $v_2$ and $v_3$ cause the first, second and third actuators 21, 22 and 23 to operate, thereby allowing the part 17a to be inserted into the part 17b by an end arm 24.

Figure 9A:
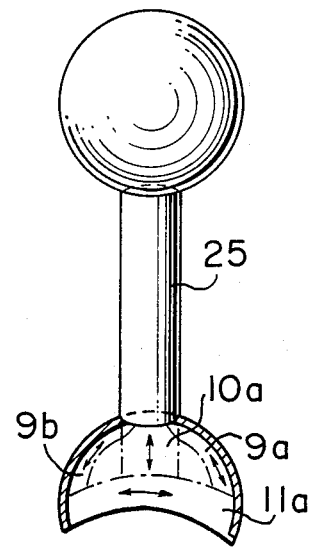
FIG. 9A and 9B are schematic views of the actuators used in the embodiment shown in FIG. 8.
Figure 9B:
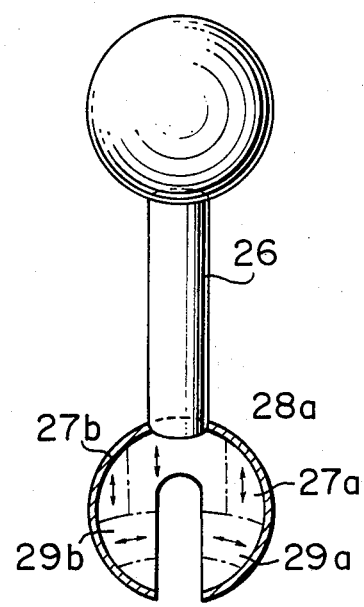

Next, the structure of the actuators 21, 22 and 23, which characterize this embodiment, will be described with reference to FIGS. 9A and 9B. FIG. 9A shows, partly in section, an arm actuator 25 having a freedom of three degrees. Every component of the robot to which this embodiment is applied consists of such an arm actuator 25 except for a first actuator 21 which constitutes the pedestal and the end arm 24. The piezoelectric elements 9 (9a, 9b), 10 (10a) and 11 (11a) driving each arm actuator 25 are mounted on the spherical inner surface thereof and have the same construction as the piezoelectric motor elements 8a, 8b and 9 shown in FIGS. 3B-3C. Accordingly, each arm actuator can be rotated around every one of three axes which intersect each other at right angles, thus allowing it to perform a movement which is by no means inferior to that of any conventional robot having six actuators or more. Furthermore, by establishing a dimensional standard for the arm actuator 25 having three degrees of freedom (sphere diameter, inner diameter of the inner sphere, and arm length) and manufacturing it on a mass production basis, inexpensive robots can be constructed with ease. The number of robot arms can be augmented solely by adding arm actuators 25 having a freedom of three degrees to the existing robot. Accordingly, the actuator can be applied to a robot with a configuration like an elephant trunk. FIG. 9B shows an arm actuator 26 having two degrees of freedom which may also be employed in this embodiment. This actuator 26, which is operated by means of three piezoelectric motor elements 27 (27a, 27b), 28 (28a) and 29 (29a, 29b), has the same basic principle as the arm actuator 25 having a freedom of three degrees.

In accordance with this embodiment, an assembly robot having a simpler structure can be constructed by using arm actuators 25 or 26. Furthermore, the arm actuators 25 and 26 can be easily standardized, thereby making it possible to manufacture a robot which is inexpensive and has an arbitrarily set number of arms. In addition, the arm actuators 25 and 26 allow easy replacement, so that, if out of order, they can be repaired in a relatively short time. Moreover, since the operation of these actuators 25 and 26 is based on frictional forces, changes in the robot position will not be caused in the case of power failure, which proves their excellence in terms of safety.

Figure 10:
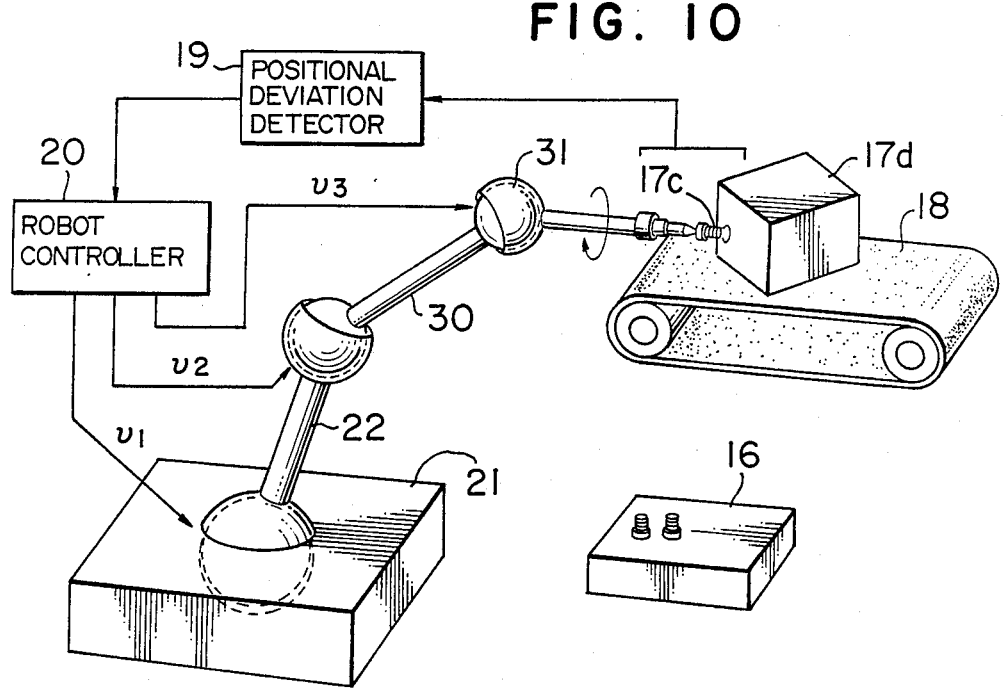
FIG. 10 is a block diagram of an embodiment of this invention applied to a screwing robot.

FIG. 10 shows an embodiment of the actuator of this invention as applied to a screwing robot. The embodiment is shown as applied to a device adapted to screw a bolt 17c into a tapped hole in a part 17d by means of a robot. This embodiment is different from that shown in FIG. 8 in that it employs an intermediate arm 30 and an end actuator 31 instead of the third actuator 23 and the end arm 24. In the case of a screwing operation, it is necessary for the end actuator 31 to be rotated at high speed around the longitudinal axis of the arm thereof after it has reached a certain position. Accordingly, voltage needs to be applied only to those piezoelectric motor elements on the inner surface of the end actuator 31 which are adapted to rotate around the longitudinal axis of the end actuator 31. If, in contrast, the same movement were to be realized with the embodiment shown in FIG. 8, the three piezoelectric motor elements of the third actuator 23 would have to be operated. Additionally, the calculation of the coordinate transformation for such an operation would have to be performed at high speed by means of the robot control device 20. Thus, the embodiment shown in FIG. 10 is advantageous in that the end actuator 31 on the work side thereof can be operated to perform screwing work without the need to conduct any coordinate transformation.

Figure 11:
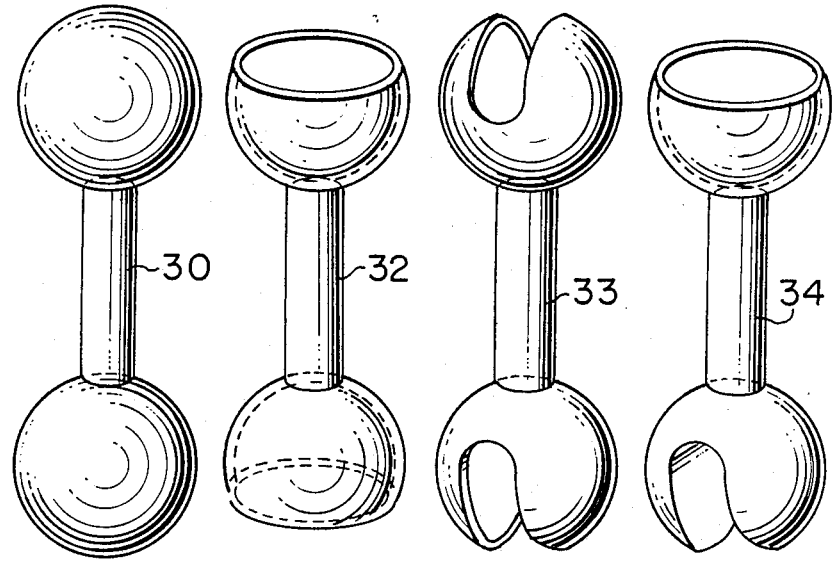
FIG. 11 is a schematic view of actuators applicable to a robot.

The number of coordinate transformations required to be conducted for robot control can be reduced by using the arms shown in FIG. 11. Thus, instead of the intermediate arm 30, one of the different arm actuators 32, 33 and 34 which have different actuators on their ends may be employed. A combination of these arms with the ones shown in FIG. 9A-9B will allow robots having different constructions to be realized.

Thus, this embodiment allows a robot to be realized which is capable of performing screwing work at high speed. Furthermore, by employing different types of arms, robots which are suitable for various different uses can be realized.

Figure 12:
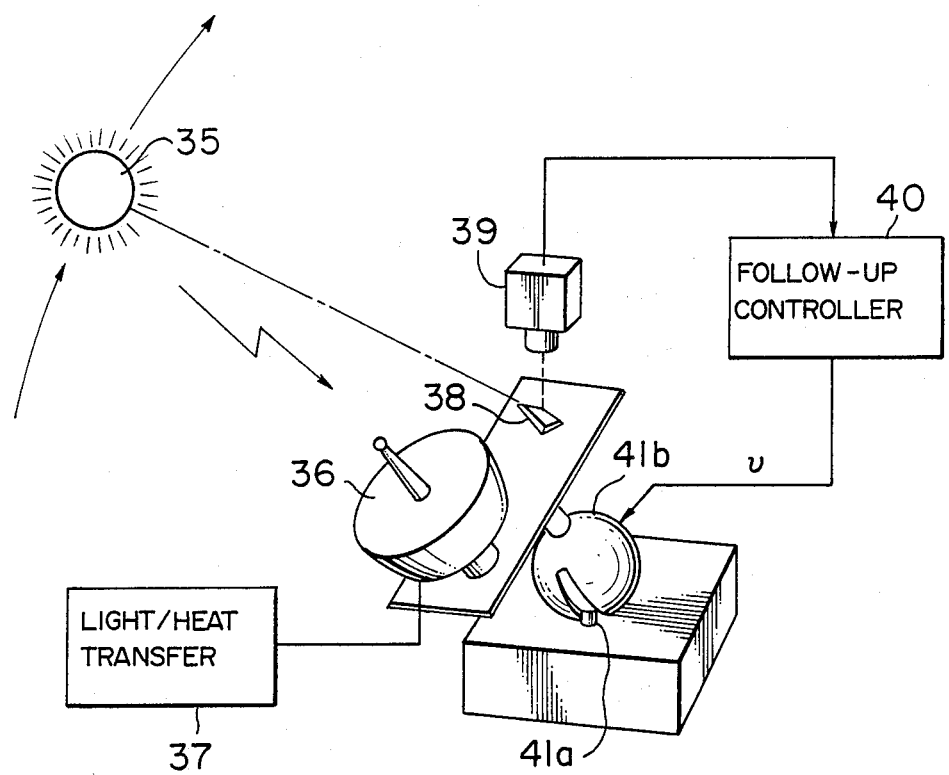
FIG. 12 is a block diagram of an embodiment of this invention applied to an automatic follow-up device for collecting solar heat and solar light.

FIG. 12 shows an embodiment of the actuator of this invention applied to an automatic follow-up device for collecting solar heat and solar light.

This automatic follow-up device is used for the purpose of collecting heat and light from the sun 35 in a solar-heat/light collector 36 and transferring this energy to a desired location by means of a light/heat transfer device 37. Since the surface of the solar-heat/light collector 36 can collect the maximum amount of heat and light when it extends in a direction perpendicular to the sun 35, a sun-position detector 38 is employed. An image sensor 39 reads the length and orientation of a shadow on this solar-position detector 38. Based on this reading, a follow-up controller 40 performs control calculation in such a manner as to keep the solar-heat/light collector 36 in a position perpendicular to the sun 35. Next, a voltage output v from the follow-up controller 40 causes an actuator 41 (41a, 41b) to operate, automatically adjusting the position of the solar-heat/light collector 36 relative to the sun 35. The follow-up actuator 41 may be based on the same basic principle as that shown in FIG. 7.

Since this embodiment allows the actuator 41 to be kept in the same position by virtue of frictional forces when no voltage is applied thereto, the positional control thereof may be effected by applying voltage to the actuator 41 several times an hour only, resulting in a substantial reduction in operating costs. A particular merit of this actuator 41 is that it has the capacity to generate powerful torque notwithstanding its small size and to provide a reliable holding force when there is no power supply, which makes it most suitable for such a device.

Apart from the above-described applications, this invention can be naturally applied to a device for moving lighting equipment such as a spotlight, a pitching machine, etc. While the above embodiments have been described with respect to actuators which are capable of rotation of two or three degrees of freedom, it goes without saying that they can be combined with a mechanism which moves straight ahead. Further, while each piezoelectric element has been described here for the purpose of facilitating comprehension as being applicable only when the actuator is moved in one particular direction which has been previously determined, it can also be used for driving it in a plurality of directions. When applying it to a follow-up device, the actuator of this invention will prove effective in following the movement of a star, an artificial satellite, a flying object or the like, as well as the sun.

In accordance with this invention, piezoelectric elements adapted to generate appropriate driving forces can be arranged over most of the contact area between a driving mechanism and a driven mechanism, thereby making it possible to realize an actuator which is small and lightweight and which is capable of generating a powerful driving force.

What is claimed is:

1. An actuator comprising:
   a hollow driving member having a mounting portion and a substantially spherical inner surface with an opening spaced from said mounting portion;
   a first group of piezoelectric motor elements adapted to generate progressive waves in a first direction;
   a second group of piezoelectric motor elements adapted to generate progressive waves in a second direction different from said first direction;
   said piezoelectric motor elements of said first and second groups being arranged alternately and disposed on said substantially spherical inner surface of said driving member;
   a driven member having a substantially spherical section and an arm section, said substantially spherical section having a substantially spherical outer surface disposed in a closely spaced face-to-face relationship with said substantially spherical inner surface of said driving member, said first and second groups of piezoelectric motor elements being disposed therebetween; and
   a power source for supplying voltages to said first and second groups of piezoelectric motor elements.

2. An actuator according to claim 1, wherein said piezoelectric motor elements of said first and second groups are disposed on substantially the entire surface of said substantially spherical inner surface of said driving member.

3. An actuator according to claim 1, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

4. An actuator according to claim 1, further comprising voltage controlling means for controlling at least one of a magnitude and a phase of said voltages supplied by said power source to said first and second groups of piezoelectric motor elements so as to drive said driven member with at least two degrees of freedom.

5. An actuator according to claim 4, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

6. A follow-up device for following movement of a moving object, comprising:
   an actuator according to claim 1;
   movement detecting means for detecting movement of a moving object and for generating an output representing said detected movement; and
   voltage controlling means responsive to said output of said movement detecting means for controlling said voltages supplied by said power source to said first and second groups of piezoelectric motor elements so as to drive said driven member with at least two degrees of freedom to follow said movement of said moving object.

7. A follow-up device according to claim 6, wherein said piezoelectric motor elements of said first and second groups are disposed on substantially the entire surface of said substantially spherical inner surface of said driving member.

8. A follow-up device according to claim 6, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

9. A follow-up device according to claim 6, wherein said voltage controlling means controls at least one of a magnitude and a phase of said voltages supplied by said power source to said first and second groups of piezoelectric motor elements in response to said output of said movement detecting means so as to drive said driven member with at least two degrees of freedom to follow said movement of said moving object.

10. A follow-up device according to claim 9, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

11. A robot comprising:
    an actuator according to claim 1;
    positional deviation detecting means for detecting a positional deviation of said driven member from a desired position and for generating an output representing said detected positional deviation; and
    voltage controlling means responsive to said output of said positional deviation detecting means for controlling said voltages supplied by said power source to said first and second groups of piezoelectric motor elements so as to drive said driven member with at least two degrees of freedom to decrease said positional deviation.

12. A robot according to claim 11, wherein said piezoelectric motor elements of said first and second groups are disposed on substantially the entire surface of said substantially spherical inner surface of said driving member.

13. A robot according to claim 11, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

14. An actuator comprising:
    a driving member having a substantially spherical outer surface;
    a driven member having a substantially spherical inner surface disposed in a closely spaced relationship with said substantially spherical outer surface of said driving member;
    a first group of piezoelectric motor elements adapted to generate progressive waves in a first direction and being arranged on said substantially spherical outer surface of said driving member;
    a second group of piezoelectric motor elements adapted to generate progressive waves in a second direction different from said first direction and being arranged on said substantially spherical inner surface of said driven member; and
    a power source for supplying voltages to said first and second groups of piezoelectric motor elements.

15. An actuator according to claim 14, wherein said piezoelectric motor elements of said first group are arranged on substantially the entire surface of said substantially spherical outer surface of said driving member.

16. An actuator according to claim 14, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

17. A follow-up device for following movement of a moving object, comprising:
an actuator according to claim 14;
movement detecting means for detecting movement of a moving object and for generating an output representing said detected movement; and
voltage controlling means responsive to said output of said movement detecting means for controlling said voltages supplied by said power source to said first and second groups of piezoelectric motor elements so as to drive said driven member with at least two degrees of freedom to follow said movement of said moving object.

18. A follow-up device according to claim 17, wherein said piezoelectric motor elements of said first group are arranged on substantially the entire surface of said substantially spherical outer surface of said driving member.

19. A follow-up device according to claim 17, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

20. An actuator comprising:
a driving member having a first substantially spherical surface;
a driven member having a second substantially spherical surface, said second substantially spherical surface being disposed in a closely spaced relationship with said first substantially spherical surface;
a first group of piezoelectric motor elements adapted to generate progressive waves in a first direction;
a second group of piezoelectric motor elements adapted to generate progressive waves in a second direction different from said first direction;
said piezoelectric motor elements of at least one of said first and second groups being arranged on at least one of said first and second substantially spherical surfaces so as to be disposed between said first and second substantially spherical surfaces and so as to cover substantially the entire surface of at least one of said first and second substantially spherical surfaces; and
a power source for supplying voltages to said first and second groups of piezoelectric motor elements.

21. An actuator according to claim 20, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

22. An actuator according to claim 20, further comprising voltage controlling means for controlling at least one of a magnitude and a phase of said voltages supplied by said power source to said first and second groups of piezoelectric motor elements so as to drive said driven member with at least two degrees of freedom.

23. An actuator according to claim 20, wherein said driving member is hollow, said first substantially spherical surface being a substantially spherical inner surface of said hollow driving member;
wherein said driven member has a substantially spherical, said second substantially spherical surface being a substantially spherical outer surface of said substantially spherical section; and
wherein said piezoelectric motor elements of said first and second groups are arranged on said substantially spherical inner surface of said driving member so as to cover substantially the entire surface of said substantially spherical inner surface of said driving member.

24. An actuator according to claim 23, wherein said piezoelectric motor elements of said first and second groups are alternately arranged on said substantially spherical inner surface of said driving member so as to cover substantially the entire surface of said substantially spherical inner surface of said driving member.

25. An actuator according to claim 23, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

26. An actuator according to claim 20, wherein said driving member has a substantially spherical outer surface, said first substantially spherical surface being said substantially spherical outer surface of said driving member;
wherein said driven member has a substantially spherical inner surface, said second substantially spherical surface being said substantially spherical inner surface of said driven member;
wherein said piezoelectric motor elements of said first group are arranged on said substantially spherical outer surface of said driving member so as to cover substantially the entire surface of said substantially spherical outer surface of said driving member; and
wherein said piezoelectric motor elements of said second group are arranged on said substantially spherical inner surface of said driven member.

27. An actuator according to claim 26, wherein each of said piezoelectric motor elements comprises an elastic member and a plurality of piezoelectric elements secured to said elastic member, said plurality of piezoelectric elements secured to said elastic member being adapted to be supplied individually with voltages from said power source.

* * * * *